United States Patent
Lickfelt

(10) Patent No.: US 8,760,283 B2
(45) Date of Patent: Jun. 24, 2014

(54) SMART COMMUNICATION SYSTEM AND METHOD FOR ILLUMINATING AN INDICATOR ON A PORTABLE DEVICE

(75) Inventor: Brian K. Lickfelt, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 306 days.

(21) Appl. No.: 13/281,967

(22) Filed: Oct. 26, 2011

(65) Prior Publication Data

US 2013/0106602 A1    May 2, 2013

(51) Int. Cl.
*G08B 1/08* (2006.01)

(52) U.S. Cl.
USPC ................................ 340/539.11; 340/426.36

(58) Field of Classification Search
USPC ........................ 340/539.11, 426.36
See application file for complete search history.

(56) References Cited

U.S. PATENT DOCUMENTS

| | | | |
|---|---|---|---|
| 6,696,983 B2 * | 2/2004 | Tang et al. | 340/989 |
| 7,388,466 B2 | 6/2008 | Ghabra et al. | |
| 7,504,931 B2 | 3/2009 | Nguyen | |
| 8,451,087 B2 * | 5/2013 | Krishnan et al. | 340/5.72 |
| 2004/0080403 A1 | 4/2004 | Eshel | |
| 2009/0002153 A1 | 1/2009 | Berstis et al. | |
| 2009/0085720 A1 * | 4/2009 | Kurpinski et al. | 340/5.64 |
| 2009/0243791 A1 | 10/2009 | Partin et al. | |
| 2009/0243795 A1 * | 10/2009 | Ghabra et al. | 340/5.72 |

FOREIGN PATENT DOCUMENTS

WO    2009/088835    7/2009

* cited by examiner

*Primary Examiner* — Kerri McNally
(74) *Attorney, Agent, or Firm* — Rankin, Hill & Clark LLP

(57) ABSTRACT

A smart communication system and method are provided for illuminating an indicator on a portable device wherein at least one search signal is transmitted from at least one vehicle antenna in response to receipt of an actuation signal requesting a vehicle function be performed. A transmitted location information signal is received after the portable device receives the at least one search signal and transmits the location information signal. Whether the particular vehicle function is appropriate is determined based on the received location information signal. Both a command signal corresponding to the vehicle function and an indicator signal for illuminating the indicator on the portable device are sent when determined that the vehicle function is appropriate to perform based on the received location information signal.

19 Claims, 4 Drawing Sheets

SMART COMMUNICATION SYSTEM AND METHOD FOR ILLUMINATING AN INDICATOR ON A PORTABLE DEVICE

BACKGROUND

Some conventional vehicle communication systems (e.g., smart entry systems) utilize a key fob that provides a user entry to a vehicle when a search field identifies the key fob therein. The search field can be transmitted in response to a user input such as grasping an outer door handle, pressing a start button, closing a door, etc. In this manner, a user can immediately access his or her vehicle or activate functionality associated therewith simply by possessing the key fob within the search field. During normal use, the user need not press any buttons on the key fob or otherwise interact with the key fob.

Some of these smart entry systems apply an LED indicator to show when a key fob is transmitting to its vehicle. More particularly, some smart communication systems employ a simple search method wherein a search field is generated to define an area around and/or inside the vehicle. If the key fob is located within the defined area, the key fob responds to the vehicle via a verification signal. Fobs of this type are sometimes provided with an LED indicator that blinks or illuminates to indicate to the user that the command that they tried to issue was at least responded to by the key fob. The action may or may not be carried out, but the user is notified that the key fob has responded. By way of example, the action may not be carried out due to a mechanical failure or other issue, such as a broken RF receiver on the vehicle. Illumination of the LED on the key fob can be a useful tool for diagnosing problems for the user and/or service technicians, even when a user is instructed over the phone via a help line.

SUMMARY

According to one aspect, a method is provided for illuminating an indicator on a portable device in a keyless vehicle system for a vehicle. In the method according to this aspect, at least one search signal is transmitted from at least one antenna on the vehicle in response to receipt of an actuation signal requesting a particular vehicle function be performed. A transmitted location information signal is received from the portable device after the portable device receives the at least one search signal and transmits the location information signal to the vehicle. Whether the particular vehicle function is appropriate to be performed is determined based on the received location information signal from the portable device. A command signal is sent corresponding to the particular vehicle function when determined that the vehicle function is appropriate to perform based on the received location information signal from the portable device. Also, an indicator signal is transmitted to the portable device for illuminating the indicator on the portable device when determined that the vehicle function is appropriate to perform based on the received location information signal from the portable device.

According to another aspect, a smart communication system for a vehicle includes a control unit onboard the vehicle for receiving an actuation signal requesting a particular vehicle function be performed. A transmitter is operatively connected to the control unit. The control unit causes the transmitter to transmit at least one search signal from at least one antenna onboard the vehicle when the actuation signal is received. A receiver is operatively connected to the control unit. The receiver is configured to receive a location information signal from a portable device after the at least one search signal is sent to and received by the portable device. The control unit determines whether the particular vehicle function should be performed based on the location information signal received by the receiver. The control unit sends a command signal corresponding to the particular vehicle function when determined that the particular vehicle function should be performed and causes the transmitter to transmit an indicator signal to the portable device for operating an indicator on the portable device that confirms the command signal was sent by the control unit.

According to a further aspect, a method is provided for illuminating an indicator on a portable device associated with a keyless vehicle system for a vehicle. In the method according to this aspect, at least one search signal is received from the vehicle corresponding to a vehicle function that is requested. A location information signal is sent to the vehicle based on the at least one search signal received from the vehicle. An indicator signal is received from the vehicle when the vehicle determines the vehicle function is to be performed based on the location information signal. An indicator on the portable device is illuminated in response to receiving the indicator signal from the vehicle.

DETAILED DESCRIPTION

Figure 6:
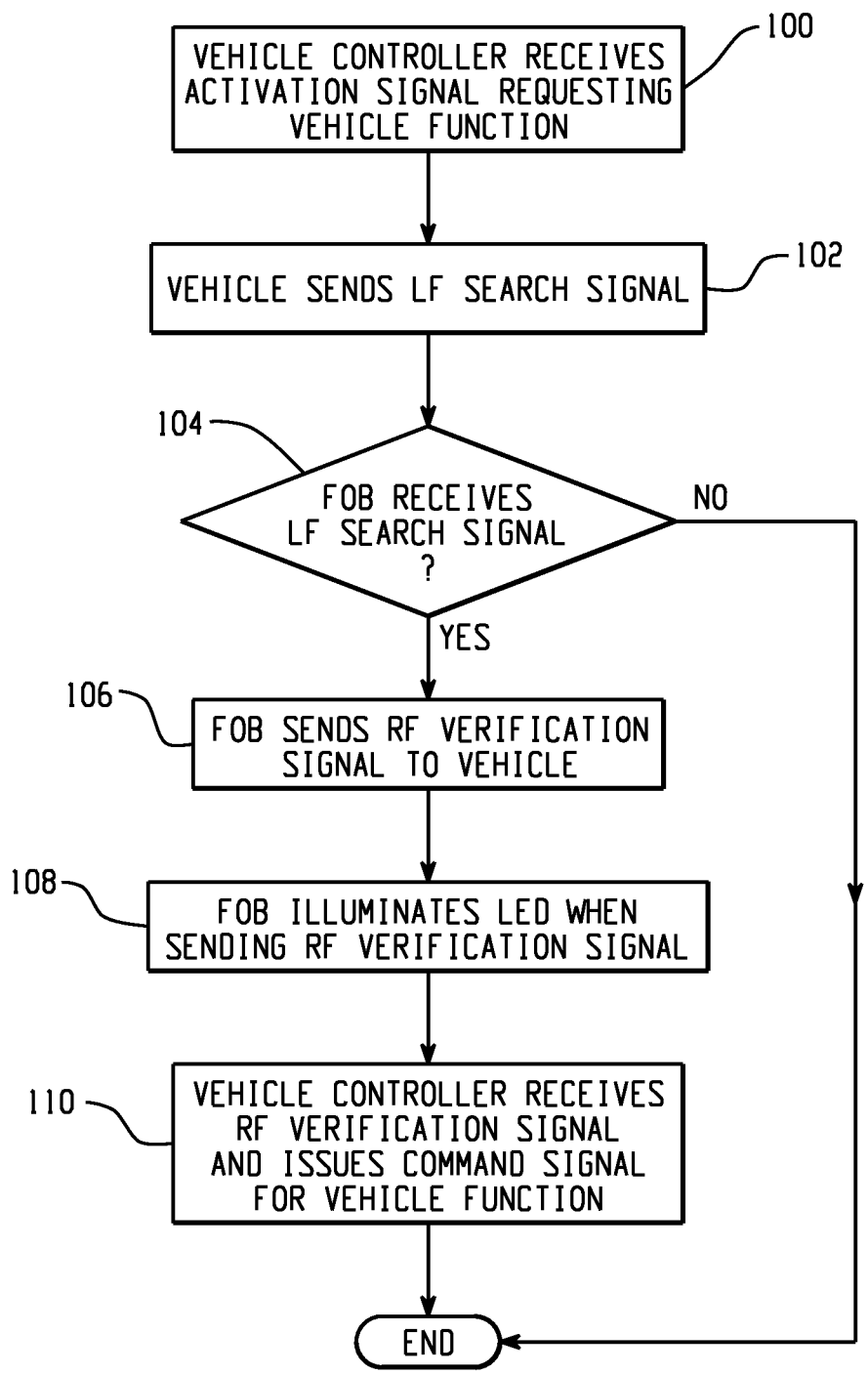
FIG. 6 is a flow diagram illustrating a known method for illuminating a LED on a key fob in a keyless entry system.

By way of example, one known system for illuminating an indicator (e.g., a LED) on a key fob in a keyless vehicle system is schematically illustrated in FIG. 6. As shown, a vehicle control unit first receives an actuation signal requesting a vehicle function in 100. After receiving the actuation system in 100, the vehicle sends an LF search signal in 102. In 104, a fob of the system can receive the LF search signal sent in 102. If the fob does not receive the LF search signal, the method ends. If the fob does receive the LF search signal in 104, the method continues to 106 wherein the fob sends an RF verification signal back to the vehicle.

The fob also illuminates an indicator, such as an LED indicator, when sending the RF verification signal to the vehicle in 108. The vehicle control unit receives the RF verification signal from the fob in 110 and issues a command signal for the vehicle function. In one example, the requested vehicle function can be unlocking of doors of the vehicle and the actuation signal can be sent to the vehicle control unit when a user grabs the handle of the vehicle door to be unlocked. The command signal sent in 110 corresponding to this vehicle function could be a command signal instructing a lock control unit to unlock the vehicle door. Notably, the fob illuminates the indicator thereon when sending the RF verification signal regardless of whether the RF signal is received by the vehicle, regardless of whether the control unit sends the command signal and/or regardless of whether the requested vehicle function is carried out in response to the command signal.

Figure 1:
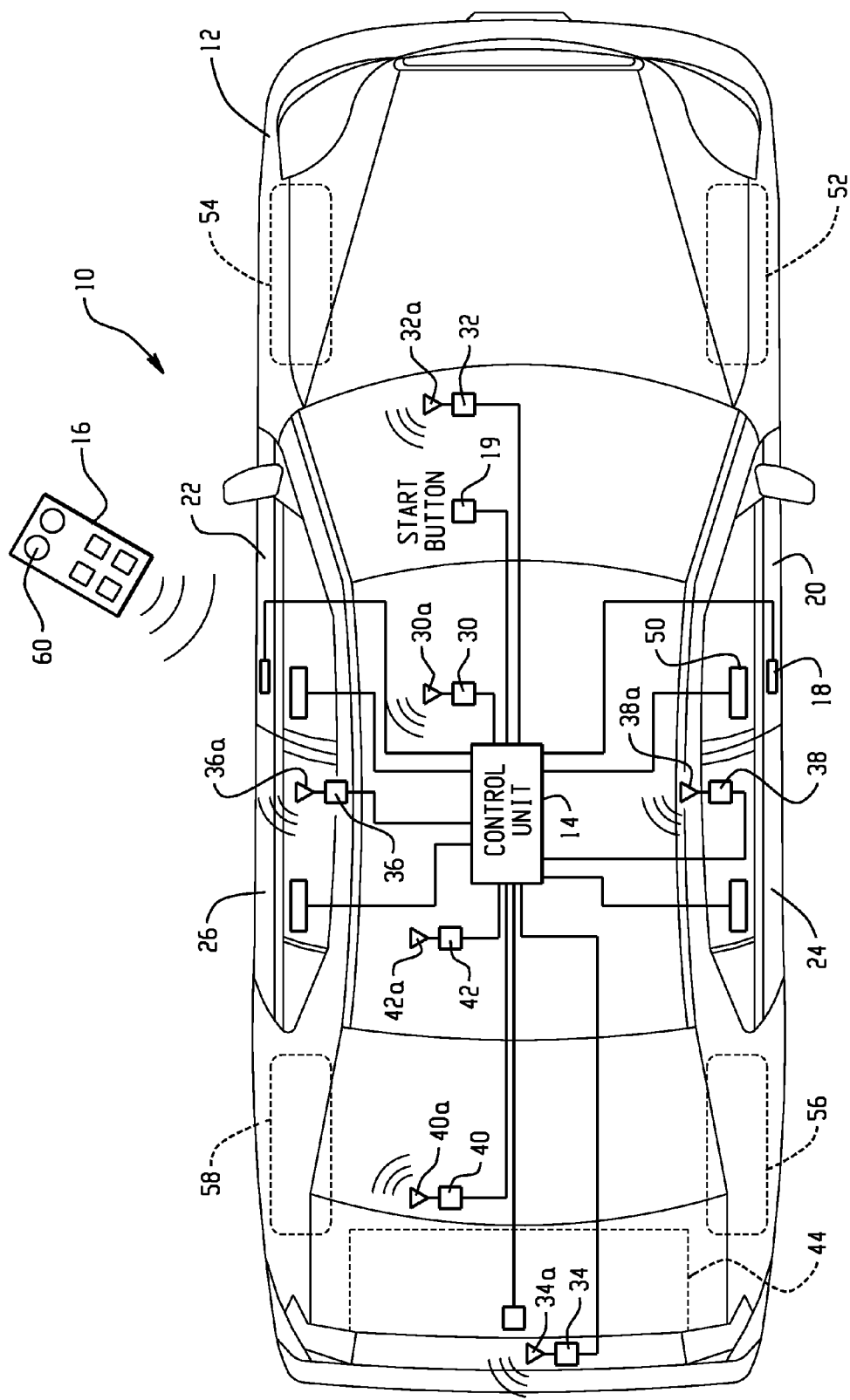
FIG. 1 is a schematic diagram showing an exemplary smart communication system for a vehicle.
Figure 2:
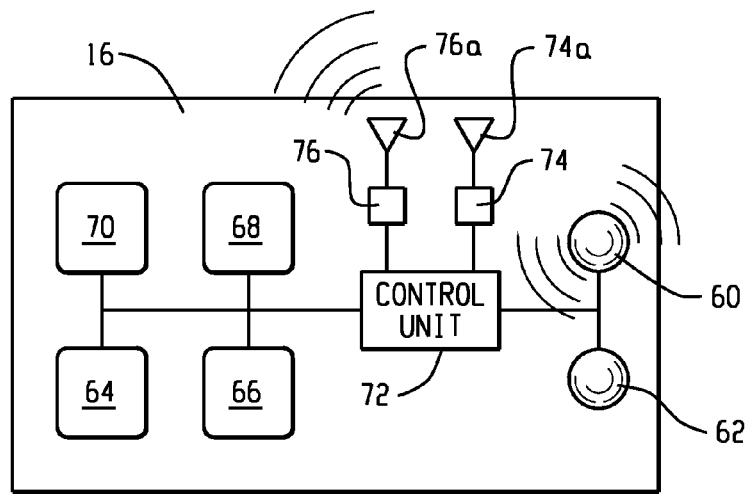
FIG. 2 is a schematic diagram of a portable device of the smart communication system.
Figure 3:
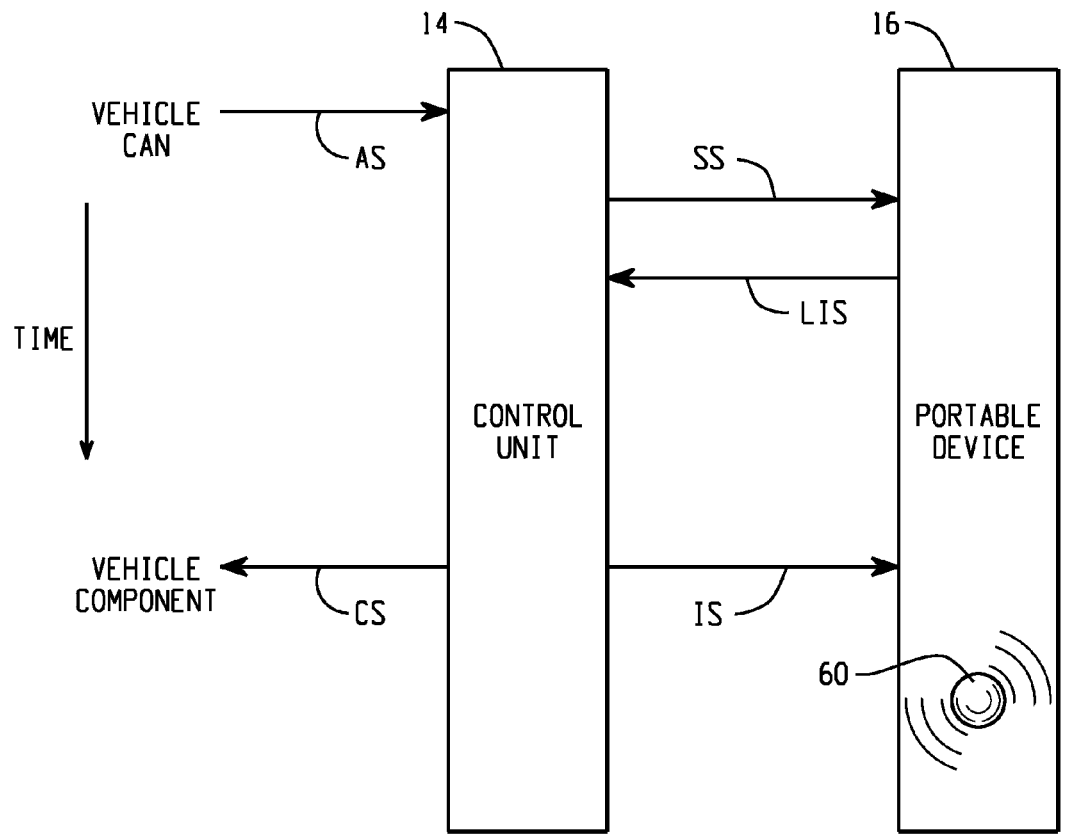
FIG. 3 is a schematic diagram showing communications to and from a control unit onboard the vehicle in the smart communication system.

Referring now to FIGS. 1-3, wherein the showings are for purposes of illustrating one or more exemplary embodiments of the present disclosure and not for purposes of limiting same, a smart communication system 10 is shown for a vehicle 12 according to one exemplary embodiment. As illustrated, the smart communication system 10 can include a control unit 14 onboard the vehicle 12 and a portable device 16 that communicates with the vehicle 12, and particularly with the control unit 14 onboard the vehicle 12. The control unit 14 can be configured for receiving an actuation signal AS (FIG. 3) requesting a particular vehicle function be performed. Exemplary vehicle functions for which the control unit 14 may receive a corresponding actuation signal AS could include starting the vehicle 12, locking or unlocking one or more closures of the vehicle 12 (e.g., a passenger door, a rear cargo door etc.), powered opening or closing of one or more closures of the vehicle 12, turning the engine or vehicle off, etc. In one example, when a user grabs door handle 18 on vehicle door 20, an actuation signal AS is sent to the control unit 14 from the door handle 18 (or a control unit and/or sensor associated with the door handle 18) to indicate to the control unit 14 that the user is requesting the door 20 (or all doors 20, 22, 24, 26) be unlocked by the ECU 14 so the user can open the door 20. In another example, when a user presses vehicle start button 19, an actuation signal AS is sent to the control unit from a control unit and/or sensor associated with the start button 19 to indicate to the control unit 14 that the user is requesting starting of the vehicle.

The portable device 16 can be a key fob or some other type of portable device (e.g., mobile phone, cellular device, wifi device, etc.). In the illustrated embodiment, the portable device 16 includes indicators 60, 62 and a plurality of buttons 64, 66, 68, 70. The indicators 60, 62 can be LED indicators that are illuminated for informing a user of various operations of the smart communication system 10. For example, as will be described in more detail herein, the indicator 60 can be illuminated in response to the portable device 16 receiving an indicator signal from a transmitter on the vehicle 12.

As schematically shown, the LED indicators 60, 62 and the buttons 64-70 can be operatively connected to a control unit 72 disposed in the portable device 16. The control unit 72 can also be operatively connected to a receiver 74 for receiving communication signals (e.g., search signals and indicator signals) via antenna 74a from the antennas on the vehicle 12. The control unit 72 can also be operatively connected to a transmitter 76 for transmitting signals (e.g., location information signals) via antenna 76a to the vehicle 12. As is known and understood by those skilled in the art, the control unit 72 can be configured to receive search signals SS (FIG. 3) from a plurality of antennas on the vehicle 12 (e.g., antennas 30a-40a) and generate a location information signal LIS (FIG. 3) for sending back to the vehicle that informs the control unit 14 onboard the vehicle 12 the distance the portable device 16 is from each of the plurality of antennas of the vehicle 12. By way of example, a received signal strength of each search signal SS can be calculated and the location information signal LIS can be generated from the calculated received signal strength.

In one embodiment, the control unit 72 of the portable device 16 is configured such that the LED indicator 60 is not illuminated when the portable device 16 sends a location information signal LIS to the vehicle 12 via the transmitter 76, but is only illuminated when receipt of the indicator signal IS via the receiver 74 from the vehicle 12 occurs. In the illustrated embodiment, the portable device 16 (and particularly the receiver 74 thereof) is configured to receive a plurality of search signals SS from the plurality of antennas 30a-40a of the vehicle 12 and further configured to send the location information signal LIS based on the plurality of search signals SS send from the plurality of antennas 30a-40a.

As shown in FIG. 1, the smart communication system 10 can include at least one transmitter operatively connected to the control unit 14 onboard the vehicle 12, such as transmitters 30, 32, 34, 36, 38 and 40 in the illustrated embodiment, for sending signals to the portable device 16. Also, the smart communication system 10 can include a receiver 42 having antenna 42a operatively connected to the control unit 14 for receiving signals from the portable device 16. As will be described in more detail below, the control unit 14 can be configured to cause the transmitter or transmitters 30-38 to transmit at least one search signal SS from at least one antenna 30a, 32a, 34a, 36a, 38a, 40a onboard the vehicle 12 when an actuation signal AS is received by the control unit 14. In the illustrated embodiment, the system 10 is shown having a plurality of transmitters 30-40 each having its own antenna 30a-40a with the antennas dispersed throughout the vehicle. It is to be appreciated, however, that there could be any number of transmitters (e.g., a single transmitter), any number of antennas, any number of antennas associate with any number of transmitters (e.g., a plurality of antennas associated with a single transmitter), etc. Also, the antennas could be provided at any suitable location on the vehicle and/or shared with other systems on the vehicle (e.g., TPMS or tire pressure management system).

In the illustrated embodiment, each antenna 30a-40a can be configured and/or located for sending a corresponding search signal SS within a particular search area at a desired strength. By way of example, the illustrated embodiment includes the antenna 30a located for providing a search area within the passenger compartment of the vehicle 12. The antenna 32a is provided at a forward portion of the vehicle 12 near front tires 52, 54 and can optionally be shared with a TPMS (tire pressure management system) of the vehicle 12, if the vehicle is so equipped. The antenna 34a can be disposed near a trunk area 44 of the vehicle 12 and can provide a search area including the trunk area 44 and/or an area provided to the rear of the vehicle 12. The antennas 36a and 38a can be respectfully provided adjacent side passenger doors 20, 22, 24, 26 for providing search fields in the vicinity of the doors 20-26. The antenna 40a can be provided near rear tires 56, 58 of the vehicle and can optionally be shared with the TPMS.

As will be described in more detail below, the receiver 42 can be configured to receive a location information signal LIS from the portable device 16 after the at least one search signal SS is sent to and received by the portable device 16. Upon receipt of the location information signal LIS from the portable device 16, the control unit 14, which is operatively connected to the receiver 42, can determine whether the particular vehicle function requested should be performed based on the location information signal LIS received by the receiver 42. For example, when a user grabs handle 18 of door 20 for purposes of unlocking and opening door 20, the actuation signal AS sent from the door handle 18 to the control unit 14 requests the particular function of unlocking the door 20. When this actuation signal AS is received by the control unit 14, a search signal or signals SS can be sent from the antenna 38a in the vicinity of the door 20 (or sent from a plurality of the antennas 30*a*-40*a*) for determining whether the portable device 16 is located within a specific search area provided about the door 20.

The portable device 16 can receive the search signal(s) SS from the antennas 30*a*-40*a* and can send a location information signal LIS back to the control unit 14 via the receiver 42. Based on the location information signal LIS, which identifies the location of the portable device 16 relative to the antennas 30*a*-40*a*, the control unit 14 can determine whether the particular vehicle function should be carried out. Continuing the example above, the control unit 14 can determine whether the door 20 should be unlocked based on the location of the portable device 16 as represented by the location information signal LIS. This determination can include deciding if the location information signal LIS indicates that the portable device 16 is within the vicinity of the door 20. When determined that a vehicle function should be carried out, the control unit 14 can send a command signal CS corresponding to the particular vehicle function and can cause one or more of the transmitters 30-40 via the antennas 30*a*-40*a* to transmit an indicator signal IS to the portable device 16 for operating an indicator on the portable device 16 that confirms the command signal CS was sent by the control unit 14.

The command signal CS and the indicator signal IS can be sent substantially simultaneous with one another from the control unit 14. Continuing the door unlocking example, the control unit 14 could send a command signal CS for unlocking the door 20 to an unlock actuator 50 and could concurrently transmit an indicator signal IS from one of more of the antennas 30*a*-40*a* to the portable device 16 for operating an indicator (e.g., LED indicator 60) on the portable device 16 that confirms the command signal CS was sent by the control unit 14. More specifically, the sending of the command signal CS and the indicator signal IS can occur at the same time or nearly at the same time (i.e., substantially simultaneous with one another). In one embodiment, physical and/or software limitations may require that the control unit 14 sends one of the signals CS or IS before sending of the other of the signals, but the sending can be substantially or nearly simultaneous (e.g., within milliseconds of one another) and, from a user's perspective, seem simultaneous.

More particularly, the control unit 14 can cause the indicator signal IS to be transmitted to the portable device 16 substantially simultaneous with sending of the command signal CS such that the portable device 16 receives the indicator signal IS irrespective of whether the particular vehicle function is actually carried out in response to the command signal CS. For example, if the particular vehicle function is unlocking of door 20 via the lock actuator 50, the control unit 14, when determining that the unlock function should be carried out, sends a command signal CS to the lock actuator 50 simultaneous (or nearly so) with sending of the indicator signal IS to the portable device 16 for lighting the indicator 60 on the portable device 16. If for some reason the lock actuator fails (e.g., due to mechanical failure), the indicator signal IS is still sent to the portable device 16 and thus is sent irrespective of whether or not the requested vehicle function is actually carried out in response to the command signal CS.

The transmitters 30-40 onboard the vehicle 12 can be configured to respectively send the search field signals SS and the indicator signal IS as low frequency signals, and the receiver 74 of the portable device 16 can be configured to receive low frequency signals. These can be at 125 KHz for example. Also, the transmitter 76 on the portable device 16 and the receiver 42 on the vehicle 12 can be configured to send and receive, respectively, the location information signal LIS as a radio frequency signal, such as around 315 MHz. Optionally, though not illustrated in the depicted embodiment, the transmitters 30-40 and receiver 42 of the vehicle can be provided as an integrated transceiver and/or the transmitter 76 and receiver 74 of the portable device 16 can be provided as an integrated transceiver, and/or the signals sent and received can all be low frequency or high frequency signals, or the low and high frequency signals could be reversed.

With particular reference to FIG. 3, a schematic depiction of the communications with the control unit 14 onboard the vehicle 12 is provided, including depicting communications between the control unit 14 and the portable device 16. As shown, the control unit 14 first receives an actuation signal AS, which can be delivered to the control unit 14 via a CAN (controller area network) of the vehicle, for example. The actuation signal AS can correspond to a particular action taken by a user for effecting a particular vehicle function. As already described, such functions could include starting of the vehicle's engine, locking or unlocking closures of the vehicle, powered opening or closing of closures on the vehicle, turning off the vehicle or the vehicle's engine, etc. In one example, the actuation signal AS is generated and sent to the control unit 14 when a user grasps a door handle 18 of door 20 for unlocking and opening door 20.

When the actuation signal AS is received by the control unit 14, the control unit 14 sends out (i.e., transmits) at least one search signal SS, which can be a low frequency search signal SS. In one embodiment, as already described, the control unit 14 sends a plurality of search signals SS from the plurality of antennas 30*a*-40*a* disbursed on the vehicle 12. The portable device 16 can receive the search signals SS from the control unit 14 and can send a location information signal LIS back to the control unit 14 on the vehicle 12. The location information signal LIS can be generated by the portable device 16, particularly the control unit 72 thereof, based on the search signals SS received by the portable device 16, and further can identify a location of the portable device 16 relative to the vehicle 12, and particularly relative to the antennas 30*a*-40*a* from which the search signals SS were sent and received.

With the location information signal LIS, the control unit 14 onboard the vehicle 12 can make a determination as to whether the particular vehicle function requested via the actuation signal AS should be performed. In particular, this determination can be made, at least in part, based on the location of the portable device 16 relative to the vehicle 12, and particularly relative to one or more of the antennas on the vehicle 12, as represented by the location information signal LIS. When determined that the particular vehicle function should be carried out, as requested via the actuation signal AS, the control unit 14 can send a command signal CS to the vehicle component responsible for carrying out the requested vehicle function (e.g., door unlock actuator 50) and an indicator signal IS to the portable device 16 for illuminating the indicator 60 on the portable device 16, the signals CS and IS being sent substantially or nearly simultaneous with one another.

Figure 4:
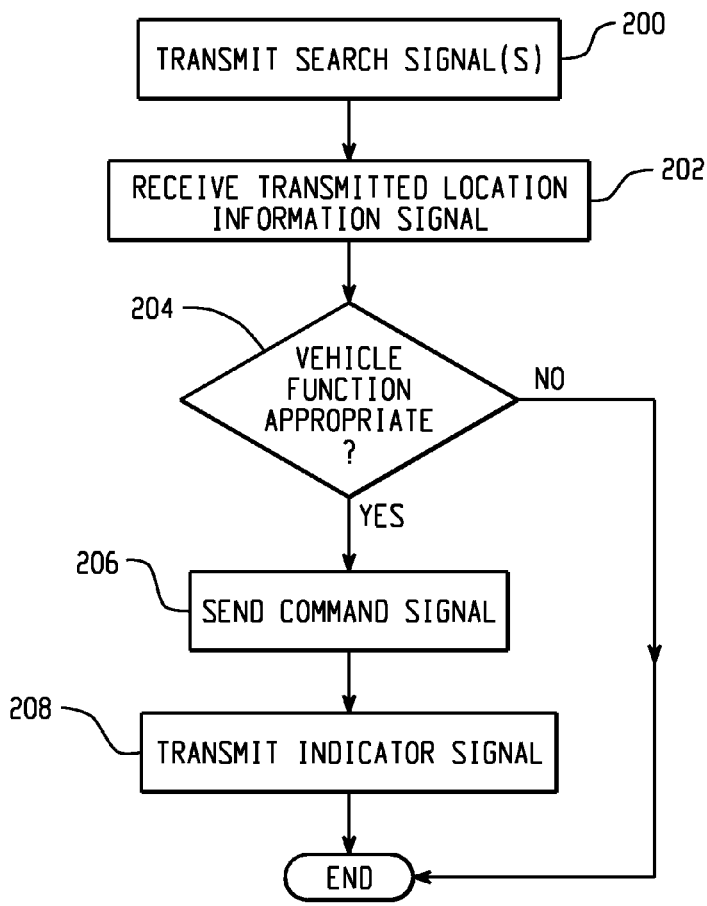
FIG. 4 is a flow diagram illustrating an exemplary method from the perspective of the control unit onboard the vehicle for illuminating an indicator on a portable device.

With reference now to FIG. 4, a method for illuminating an indicator on a portable device in a keyless vehicle system for a vehicle will now be described. In particular, the method of FIG. 4 will be described in association with the smart communication system 10 of FIGS. 1-3, though this is not required. Also, the method of FIG. 4 will be described from the perspective of the vehicle 12 and the communications sent and received by the vehicle 12. As shown, in 200, at least one search signal SS is transmitted from at least one antenna 30*a*-40*a* on the vehicle 12 in response to receipt of an actuation signal AS requesting a particular vehicle function be performed. As already described, the actuation signal AS can be associated with a particular vehicle function being requested by a user, such as unlocking a door on the vehicle, and can be sent over the vehicle's CAN.

In 202, a transmitted location information signal LIS is received from the portable device 16 after the portable device 16 receives the at least one search signal SS and transmits the location information signal LIS to the vehicle 12. In 204, a determination is made by the control unit 14 as to whether the particular vehicle function requested is appropriate to perform based on the received location information signal LIS from the portable device 16. For example, the location information signal may indicate to the control unit 14 the location of the portable device 16 and the control unit 14 can determine if the requested vehicle function is appropriate based on this location of the portable device 16. If the requested vehicle function is unlocking door 20, the determination may include determining if the location information signal LIS indicates that the portable device 16 is within a preselected area or vicinity of door 20. If the determination is "no" in 204, the method ends; if yes, the method proceeds to S206.

In S206, a command signal CS is sent corresponding to the particular vehicle function that is to be performed. In particular, the command signal CS is sent corresponding to the particular vehicle function requested when determined in S204 that the vehicle function is appropriate to perform based on the received location information signal LIS from the portable device 16. Also, as shown in 208, an indicator signal IS is also transmitted to the portable device 16 for illuminating the indicator 60 on the portable device 16 when determined in 204 that the vehicle function is appropriate to perform based on the received location information signal from the portable device 16.

The indicator signal IS is transmitted in 208 when determined in 204 that the vehicle function is appropriate to perform based on the received location information signal LIS irrespective of whether the vehicle function is actually performed in response to the command signal CS sent in 206. As already discussed herein, the indicator 60 on the portable device 16 can be an LED indicator that illuminates when the portable device 16 receives the indicator signal IS from the vehicle 12. Also as already discussed herein, the particular vehicle function can be one of engine starting, door unlocking, door locking, power door opening, power door closing, trunk unlocking or trunk locking, or any other function controlled on the vehicle 12 or some other vehicle function.

In the method, as already described above in the system 10, the actuation signal AS can be generated in response to an actuation operation (e.g., grabbing a handle on a vehicle door) corresponding to the particular vehicle function. In one embodiment, by way of example, the actuation signal AS can be generated when a user grabs a door handle (e.g., door handle 18) and the particular vehicle function can be door unlocking of at least one door (e.g., door 20) of the vehicle 12. The command signal CS can be sent (when determined that door unlocking is appropriate) to the door unlock actuator 50 and the indicator signal IS can be simultaneously (or nearly so) sent to the portable device 16 to illuminate the indicator 60 thereon to provide a visual indication that the command signal CS was sent.

Figure 5:
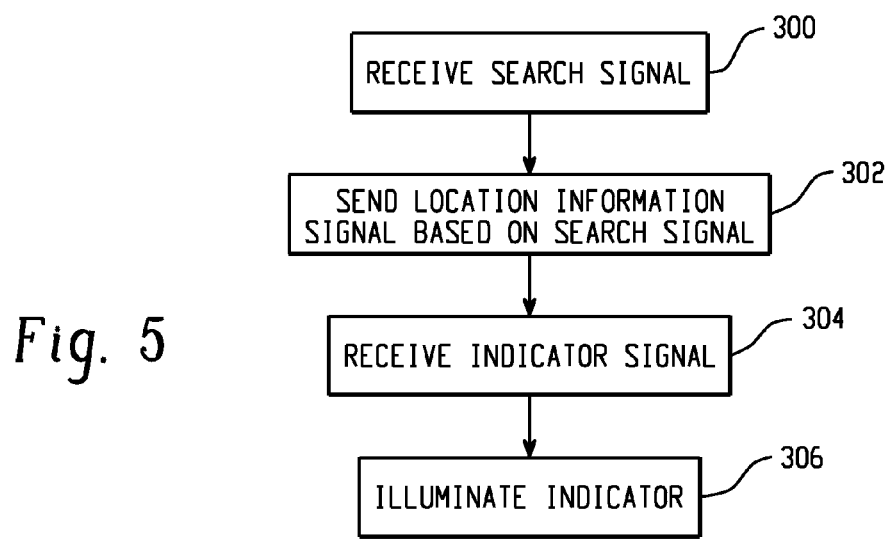
FIG. 5 is a flow diagram illustrating an exemplary method from the perspective of the portable device for illuminating the indicator thereon.

With reference to FIG. 5, a method will now be described for illuminating an indicator on a portable device associated with a keyless system for a vehicle. In particular, the method of FIG. 5 will be described in association with the smart communication system 40 illustrated on FIGS. 1-3, though this is not required. The method of FIG. 5 will be particularly be described from the perspective of the portable device 16.

Specifically, in 300, at least one search signal SS is received from the vehicle 12 corresponding to a vehicle function that is requested. In 302, the location information signal LIS is sent to the vehicle 12 based on the at least search signal SS received from the vehicle in 300. In other words, the portable device 16 generates the location information signal LIS from the received search signals SS and then sends the location information signal LIS to the vehicle 12. In S304, an indicator signal IS is received from the vehicle 12 when the vehicle determines the vehicle function is to be performed based on the location information signal LIS sent in 302. In 306, the indicator 60 on the portable device 16 (e.g., key fob) is illuminated in response to receiving the indicator signal IS from the vehicle in 304.

Advantageously, the systems and methods described herein allow an indicator (e.g., LED 60) on a portable device, such as a key fob, to function similar to known systems and methods. Accordingly, despite the varied communication protocol between the portable device and the vehicle, the LED functions similar to the known method from the user's perspective. By way of example, the LED 60 on the portable device 16 can function from the user's perspective similar to how a LED on key fob would appear to function in the known method of FIG. 6. More particularly, in the known method the key fob LED flashes when an RF signal is sent to the vehicle confirming that the key fob has responded to the search signals sent from the vehicle. To the user, this confirms that the fob has responded. In the systems and method of FIGS. 1-5, the LED 60 illuminates or flashes when the indicator signal is received from the vehicle. To the user, this confirms that the portable device 16 is responding similar to how the user perceives the fob to operate in the known system.

It is to be appreciated that in connection with the particular exemplary embodiments presented herein certain structural and/or functional features are described as being incorporated in defined elements and/or components. However, it is contemplated that these features may, to the same or similar benefit, also likewise be incorporated in common elements and/or components, or separated, where appropriate. For example, the transmitters 30-40 could be integrated. It is also to be appreciated that different aspects of the exemplary embodiments may be selectively employed as appropriate to achieve other alternative embodiments suited for desired applications, the other alternate embodiments thereby realizing the respective advantages of the aspects incorporated herein.

It is also to be appreciated that particular elements or components described herein may have their functionality suitably implemented via hardware, software, firmware, or in combination thereof. Additionally, it is to be appreciated that certain elements described herein as incorporated together may under suitable circumstances be stand-alone elements or otherwise divided. Similarly, a plurality of particular functions described as being carried out by one particularly element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for illuminating an indicator on a portable device in a keyless vehicle system for a vehicle, comprising:
    transmitting at least one search signal from at least one antenna on the vehicle in response to receipt of an actuation signal requesting a particular vehicle function be performed;
    receiving a transmitted location information signal from the portable device after the portable device receives the at least one search signal and transmits the location information signal to the vehicle;
    determining whether the particular vehicle function is appropriate to perform based on the received location information signal from the portable device;
    sending a command signal corresponding to the particular vehicle function when determined that the vehicle function is appropriate to perform based on the received location information signal from the portable device; and
    transmitting an indicator signal to the portable device for illuminating the indicator on the portable device when determined that the vehicle function is appropriate to perform based on the received location information signal from the portable device, wherein the command signal and the indicator signal are sent substantially simultaneous with one another.

2. The method of claim 1 wherein the indicator signal is transmitted when determined that the vehicle function is appropriate to perform based on the received location information signal irrespective of whether the vehicle function is actually performed.

3. The method of claim 1 wherein the indicator on the portable device is an LED indicator that illuminates when the portable device receives the indicator signal from the vehicle.

4. The method of claim 1 wherein the particular vehicle function is one of engine starting, door unlocking, door locking, powered door opening, powered door closing, trunk unlocking or trunk locking, and wherein the actuation signal is generated in response to an actuation operation corresponding to the particular vehicle function.

5. The method of claim 4 wherein the actuation signal is generated when a user grabs a door handle and the particular vehicle function is door unlocking of at least one door of the vehicle including a door having the door handle, the command signal sent when determined that door unlocking is appropriate to a door unlock actuator and the indicator signal sent to the portable device to illuminate the indicator thereon to provide a visual indication that the command signal was sent.

6. The method of claim 1 wherein transmitting each of the at least one search signal and the indicator signal includes transmitting at low frequency.

7. The method of claim 1 wherein receiving the location information signal includes receiving a radio frequency signal.

8. The method of claim 1 wherein the portable device is a key fob.

9. A smart communication system for a vehicle, comprising:
    a control unit onboard the vehicle for receiving an actuation signal requesting a particular vehicle function be performed;
    a transmitter operatively connected to the control unit, the control unit causing the transmitter to transmit at least one search signal from at least one antenna onboard the vehicle when the actuation signal is received; and
    a receiver operatively connected to the control unit, the receiver configured to receive a location information signal from a portable device after the at least one search signal is sent to and received by the portable device, wherein the controller determines whether the particular vehicle function should be performed based on the location information signal received by the receiver, the controller sending a command signal corresponding to the particular vehicle function when determined that the particular vehicle function should be performed and causing the transmitter to transmit an indicator signal to the portable device for operating an indicator on the portable device that confirms the command signal was sent by the control unit wherein the control unit causes the indicator signal to be transmitted to the portable device at the same time or nearly at the same time with sending of the command signal such that the portable device receives the indicator signal irrespective of whether the particular vehicle function is actually carried out in response to the command signal.

10. The smart communication system of claim 9 wherein the indicator is an LED indicator disposed on the portable device that is illuminated in response to the portable device receiving the indicator signal from the transmitter of the vehicle.

11. The smart communication system of claim 10 wherein the LED indicator is not illuminated when the portable device sends the location information signal.

12. The smart communication system of claim 9 wherein the transmitter onboard the vehicle is configured to send the at least one search signal and the indicator signal as low frequency signals.

13. The smart communication system of claim 12 wherein the receiver is configured to receive the location information signal as a radio frequency signal.

14. The smart communication system of claim 9 wherein the transmitter and the receiver are together provided as an integrated transceiver.

15. The smart communication system of claim 9 wherein the transmitter includes a plurality of antennas for sending a plurality of search signals to the portable device, the portable device configured to receive the plurality of search signals from the plurality of antennas and further configured to send the location information signal based on the plurality of search signals sent from the plurality of antennas.

16. The smart communication system of claim 15 wherein the location information signal informs the control unit the distance the portable device is from each of the plurality of antennas.

17. A method for illuminating an indicator on a portable device associated with a keyless vehicle system for a vehicle, comprising:
    receiving at least one search signal from the vehicle corresponding to a vehicle function that is requested;
    sending a location information signal to the vehicle based on the at least one search signal received from the vehicle;
    receiving an indicator signal from the vehicle when the vehicle determines the vehicle function is to be performed based on the location information signal, the indicator signal sent substantially simultaneous with a command signal corresponding to the vehicle function; and
    illuminating an indicator on the portable device in response to receiving the indicator signal from the vehicle.

18. The method of claim 17 further including:
calculating a received signal strength of the at least one search signal and generating the location information signal from the received signal strength.

19. The method of claim 17 wherein the at least one search signal includes a plurality of low frequency search signals received from a plurality of antennas on the vehicle.

\* \* \* \* \*